J. H. ALLING.
PROCESS OF RECOVERING FINE GOLD.
APPLICATION FILED AUG. 15, 1910.
Reissued Nov. 7, 1911. 13,307.
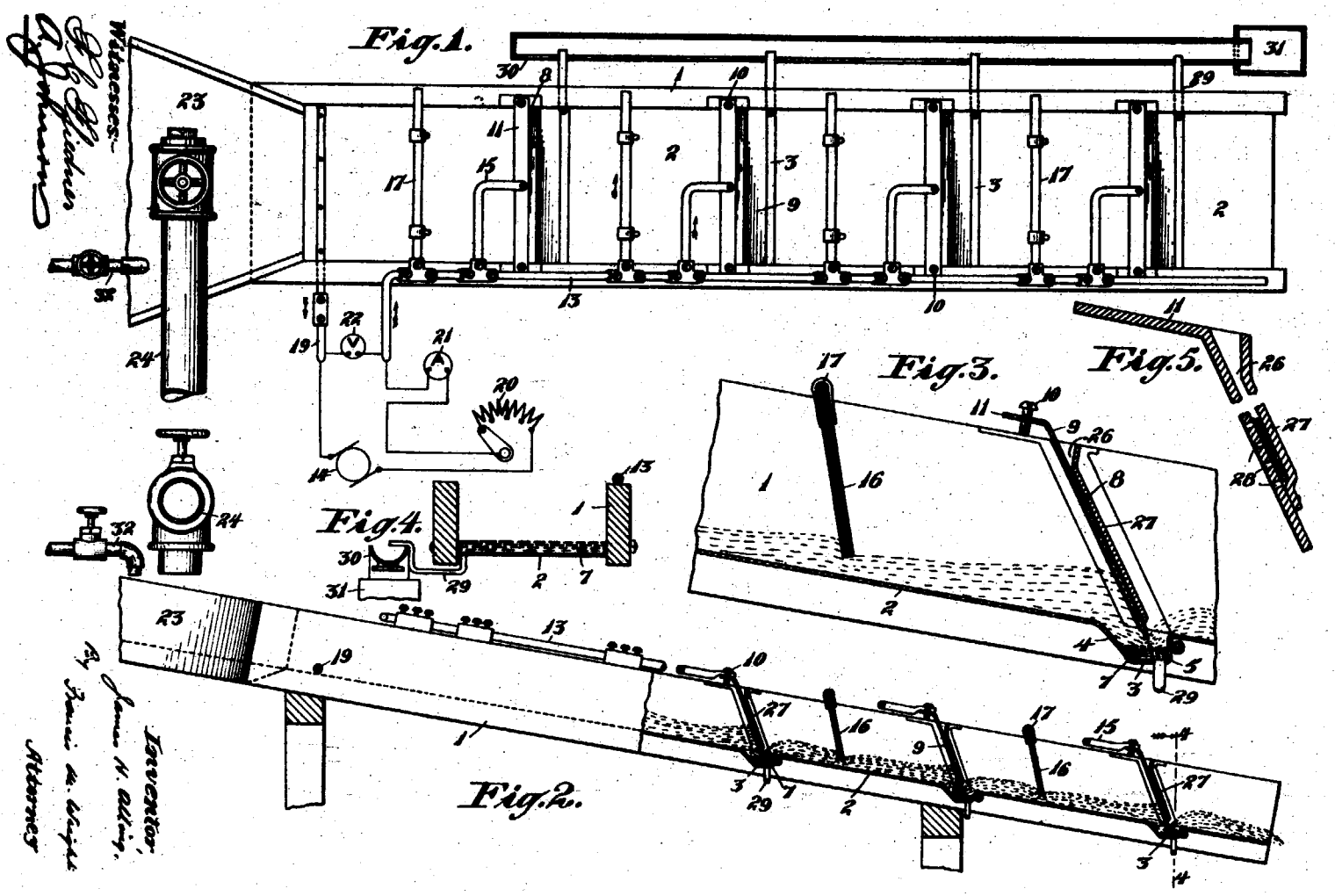

UNITED STATES PATENT OFFICE.

JAMES H. ALLING, OF COLUMBIA, CALIFORNIA, ASSIGNOR, BY DIRECT AND MESNE ASSIGNMENTS, TO SECURITY AND HOLDING COMPANY, OF SAN FRANCISCO, CALIFORNIA, A CORPORATION OF CALIFORNIA.

PROCESS OF RECOVERING FINE GOLD 13,307. Specification of Reissued Letters Patent. Reissued Nov. 7, 1911.

Original No. 947,957, dated February 1, 1910, Serial No. 430,695. Application for reissue filed August 15, 1910. Serial No. 577,337.

*To all whom it may concern:*

Be it known that I, JAMES H. ALLING, a citizen of the United States, residing at Columbia, in the county of Tuolumne and State of California, have invented new and useful Improvements in Processes of Recovering Fine Gold, of which the following is a specification.

The object of the present invention is to provide a process for the recovery of very fine particles of gold, silver, and platinum.

There are known to exist large natural deposits of gold-bearing material which are comparatively rich in the precious metal, but from which the gold cannot be recovered by any known process except smelting; and as the cost of smelting is from $5.00 to $7.00 a ton, besides the freight, the cost by smelting is prohibitive except for very valuable ores. The reason why such gold cannot be recovered by ordinary methods is, either that the particles of gold are so extremely minute, that they float away, and cannot be arrested in the ordinary sluices, amalgamators, and other apparatus in general use, or that the particles of gold are incased in capsules of material which has to be removed by grinding, so that the particles of gold will be separated as free gold, and recovered by amalgamation. But, to do this the material must be ground to such a degree of fineness, say 100 mesh or smaller, that, in this case also, the ordinary methods of recovering this very fine gold proves impracticable or too expensive. In addition, there are, in the States of California, Nevada and elsewhere, large deposits of tailings from former workings of ore, which tailings contain a large amount of gold, but in such a finely divided state as not to be recoverable by ordinary methods. Also many of these dumps, which containing finely divided gold, also contain such large quantities of copper, iron or arsenical pyrites, and other baser ores, that the ordinary cyanid process cannot be profitably applied thereto, on account of the baser ores consuming too large a proportion of the cyanid. These can be worked by my process.

In the accompanying drawing, Figure 1 is a plan view, of the apparatus; Fig. 2 is a broken side view of the same; Fig. 3 is an enlarged broken detail longitudinal section of the same; Fig. 4 is a cross section on the line 4—4 of Fig. 3; Fig. 5 is an enlarged broken detail longitudinal section through an anode plate and mercury pocket.

Referring to the drawing, 1 indicates a sluice box which is sloped at a greater angle than are the sluice boxes used for the recovery of gold in the ordinary processes. In the bottom of said sluice box is a continuous amalgamating plate 2 formed at suitable intervals into pockets or troughs 3. Each pocket is formed with a rear wall 4 having a considerable slope nearly 45 degrees, to the vertical, a front wall 5 sloping slightly backward from the vertical, and a bottom substantially horizontal. In each pocket is placed sufficient quantity of mercury, shown at 7. The sides of the sluice box are formed with oblique grooves 8 inclined rearwardly upward, and across said sluice box extend anode amalgamating plates 9, with their edges in said grooves. The lower edges of said plates extend to within a short distance, say ⅛ of an inch, from the upper surface of the mercury in the troughs or pockets 3. The height of each plate can be adjusted by means of adjusting screws 10 screwed through lips 11 extending from the plates over the sides of the sluice box, said screws resting on the tops of said sides.

Extending along one side of the sluice box is an electric conductor 13, connected to the positive pole of an electric current generator 14. This conductor is connected by conductors 15 with the several plates 9, which thus serve as anodes for currents of electricity. The conductors 13 and 15 are made of large conductivity in proportion to the current in order to avoid any heating effect whatever.

In addition to the anode plates 9 there are provided swinging carbon anodes 16 suspended from bars 17 extending across between the tops of the sides of the sluice box, substantially midway between the anode plates 9. In certain cases, it may be desirable to interpose more than one swinging anode between each pair of anode plates. These cross bars 17 are electrically connected to the longitudinal conductor 13.

The cathode plate 2 is connected by a wire 19 to the source of the electric current.

The material, having been first finely pulverized, is fed by a chute 23 into the top of the sluice box. At the same time there is fed, by a pipe 24, a sufficient quantity of water, about 4 tons to 1 ton of material, and through a pipe 32 is fed a small proportion, about 1 to 1000, 2000, or more parts, of a mixture consisting of aqueous solutions of potassium cyanid and mercuric chlorid. The proportion of the mixture to the water will vary according to the richness of the material being treated, the rule being to supply, in the mercuric chlorid, one ounce of mercury to each ounce of gold in the material. In treating certain ores, I have found satisfactory proportions by weight to be ½ to 1 lb. of potassium cyanid to 2 oz. mercuric chlorid and 5 gallons of the solution. The addition of the cyanid facilitates the electrolysis and cleans the gold. The electric current passes from the anode plates and swinging anodes into and through the water and other material flowing down the sluice box and enters the cathode plate 2 in the bottom of the sluice box, either directly, or through the mercury in the troughs or pockets 3 thereof. The density of the current used is comparatively low, being from $\frac{1}{10}$ to 1 ampere for each square foot of cathode surface according to the richness of the material. For the purpose of varying the amount of current for different material a rheostat 20 is provided. I have found a voltage of 5 volts to be satisfactory in practice. An ammeter 21 and volt meter 22 are used to indicate the current and voltage.

By the above described process I have been able to save over 95 per centum of the values of material containing finely divided gold, which cannot be saved by ordinary processes.

It is in order to replenish the aqueous solution of mercuric chlorid with mercury that the surface of the anode is amalgamated and since the mercury is continually being removed from the rear surface of the anode plates by electrolysis as well as by the impact of the particles of gold thereagainst it is desirable to replace this mercury as fast as removed, so that there will always be a sufficient coating of mercury upon the anode plates to obtain a proper action of the apparatus. Many contrivances may be adapted for this purpose and I show herein the following. Upon the front or upper side of each anode plate is formed a narrow chamber 26, the rear wall of said chamber being formed by the anode plate itself, and the front wall 27 being parallel to said anode plate. This chamber is, at suitable intervals of time, supplied with mercury, and the mercury runs from said chamber through very minute perforations 28 in the anode plate to the rear wall thereof, on which it spreads immediately upon its emergence from said perforations, forming a thin film or coating upon the silvered surface of the plate. The mercury which tends to collect at the bottom of each trough is drawn off by an overflow pipe 29 running from the bottom of the trough and thence to the side of the apparatus and then upward to such a level, that when the mercury rises to a certain level in its trough it will overflow said overflow pipe 29 into a conduit 30 leading to a receptacle 31. From this receptacle it can be removed from time to time and retorted or redistributed among the several mercury chambers. By this means the levels of the troughs are maintained constant notwithstanding the continual addition thereto of the mercury coming from the anode plates. Thus there is no loss whatever of mercury, and there can be no flouring of the mercury, on account of the electric current continually passing therethrough.

The nature of the process is as follows:—The current of electricity passing through the auriferous material and mercuric chlorid in solution decomposes the mercuric chlorid. The chlorin immediately attacks the very thin film or coating of rust or other oxid and removes said oxid, thus rendering the gold fit for amalgamation.

The words "immediately thereafter" in the claim refer not so much to the period of time intervening between the preceding and subsequent steps recited therein as to the fact that between those steps there is no intermediate step of the process or treatment of the material.

I claim:—

The method of recovering gold which consists in mixing ore containing gold in a finely comminuted state with an aqueous solution of a chlorin compound, immediately thereafter causing the mixture of solution and pulp to flow in succession freely in contact with a series of mercury cathodes, passing currents of electricity through the flowing mixture to said cathodes, the amount of chlorin compound and the magnitude of said currents being sufficiently great to liberate nascent chlorin in sufficient quantities to reduce the gold to a condition in which it is readily amalgamated, and recovering the gold from the cathodes.

JAMES H. ALLING.

Witnesses:

CHARLES A. DINGMAN,
JAMES G. FALLON.